J. S. ESTLIN.
Apparatus for Dissolving and Washing Clay.
No. 219,239.          Patented Sept. 2, 1879.
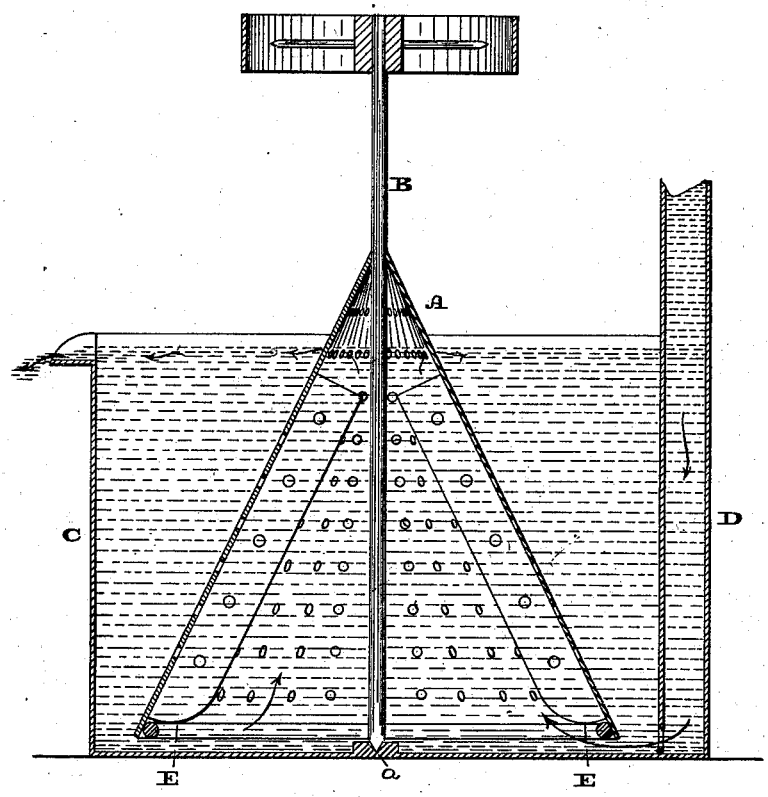
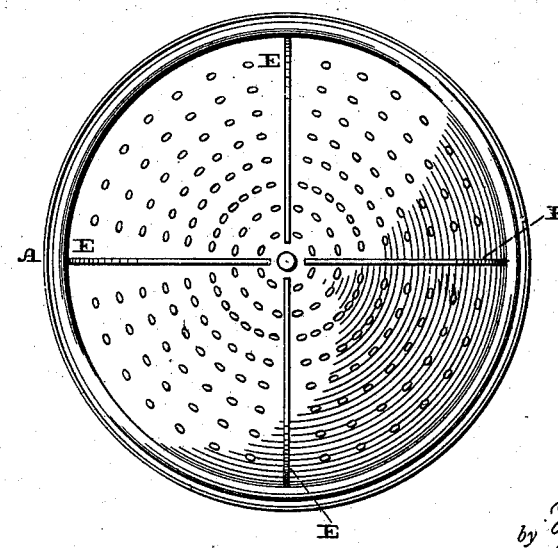
Witnesses:
Jo. P. Grant,
W. F. Kircher
Inventor:
John S. Estlin,
by John A. Diedersheim
ATTORNEY.

UNITED STATES PATENT OFFICE.

JOHN S. ESTLIN, OF PHILADELPHIA, PENNSYLVANIA.

IMPROVEMENT IN APPARATUS FOR DISSOLVING AND WASHING CLAY.

Specification forming part of Letters Patent No. 219,239, dated September 2, 1879; application filed March 3, 1879.

*To all whom it may concern:*

Be it known that I, JOHN S. ESTLIN, of the city and county of Philadelphia, and State of Pennsylvania, have invented a new and useful Improvement in Apparatus for Dissolving and Washing Clay, which improvement is fully set forth in the following specification and accompanying drawings, in which—

Figure 1 is a central vertical section of the apparatus embodying my invention. Fig. 2 is a bottom view of the interior vessel.

Similar letters of reference indicate corresponding parts in the two figures.

My invention consists of a perforated conical-shaped vessel rotating within a receiver for clay and water, whereby the clay is dissolved and washed and discharged in a refined state.

Referring to the drawings, A represents a vertically-arranged conical-shaped vessel having numerous perforations, and secured to a shaft, B, which is properly mounted on a step, *a*, at the bottom of the receiving-vessel C, and provided with a band-wheel or crank for purposes of rotation.

The receiving-vesel C is preferably cylindrical, and it is provided with a water-inlet pipe, D, which leads to the bottom of said vessel.

To the inner face of the conical vessel A there are secured vanes E, which extend vertically, and are perforated or formed of gauze.

The operation is as follows: Clay in sufficient quantities is placed in the receiver C, running water introduced through the pipe D, so as to reach the bottom of the mass of clay, and power communicated to the cone A in order to rotate it, whereby the clay is dissolved and washed, and the lighter or pure grade of clay, separated from the heavier grades by agitation, is raised in the cone A, owing to the upward current of water created in the cone, while the heavier matters—sand, grit, &c.— remain at the bottom of the vessel, from whence they may be subsequently discharged. The light, fine, or pure clay, of a pasty consistency, passes through the upper openings of the cone, and is carried off in a refined condition by the overflowing water at the top of the vessel to a place of collection or the drying apparatus.

Provision may be made for collecting the different grades by stop-cocks or outlets applied to the vessel C at proper levels.

Having thus described my invention, what I claim as new, and desire to secure by Letters Patent, is—

1. The conical vessel A, receiving-vessel C, and water-inlet D, combined and operating substantially as and for the purpose set forth.

2. The perforated vessel A, provided with vanes E, and rotating within the receiving-vessel C, having a water-inlet, D, substantially as and for the purpose set forth.

JOHN S. ESTLIN.

Witnesses:
JOHN A. WIEDERSHEIM,
H. E. GARSED.